(12) United States Patent
Mitchell

(10) Patent No.: US 12,395,475 B2
(45) Date of Patent: *Aug. 19, 2025

(54) CRYPTOGRAPHIC SYSTEMS AND METHODS

(71) Applicant: Intertrust Technologies Corporation, Berkeley, CA (US)

(72) Inventor: Stephen G. Mitchell, Ben Lomond, CA (US)

(73) Assignee: Intertrust Technologies Corporation, Berkeley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/530,893

(22) Filed: Dec. 6, 2023

(65) Prior Publication Data

US 2024/0106809 A1   Mar. 28, 2024

Related U.S. Application Data

(63) Continuation of application No. 17/530,009, filed on Nov. 18, 2021, now Pat. No. 11,848,922, which is a
(Continued)

(51) Int. Cl.
*H04L 9/40* (2022.01)
*H04L 9/08* (2006.01)
*H04L 9/32* (2006.01)

(52) U.S. Cl.
CPC .......... *H04L 63/045* (2013.01); *H04L 9/0825* (2013.01); *H04L 9/0897* (2013.01);
(Continued)

(58) Field of Classification Search
CPC ... H04L 63/045; H04L 9/0825; H04L 9/0897; H04L 9/3247; H04L 63/061;
(Continued)

(56) References Cited

U.S. PATENT DOCUMENTS 5,991,399 A * 11/1999 Graunke .......... G11B 20/00086
713/168
6,735,313 B1 * 5/2004 Bleichenbacher ..........................
H04N 21/4405
348/E7.056
(Continued)

FOREIGN PATENT DOCUMENTS

EP          2341682 A1     7/2011
WO    WO-2011068996 A1 *  6/2011   .......... G06F 12/1408

OTHER PUBLICATIONS

Final Office Action mailed Apr. 17, 2018, received in U.S. Appl. No. 14/991,687.
(Continued)

*Primary Examiner* — David Garcia Cervetti
(74) *Attorney, Agent, or Firm* — John P. Davis; Thayne and Davis LLC

(57) ABSTRACT

Systems and methods are described that use cryptographic techniques to improve the security of applications executing in a potentially untrusted environment associated with a software application. Embodiments of the disclosed systems and methods may, among other things, facilitate cryptographic operations within an execution environment associated with browser software of a client system while maintaining security of cryptographic keys imported into the environment. As the security of keys is maintained in an execution environment implementing embodiments of the disclosed systems and methods, users and/or systems may be more willing to consign their keys for use in connection with cryptographic operations performed in such environments.

18 Claims, 5 Drawing Sheets

Related U.S. Application Data continuation of application No. 16/245,447, filed on Jan. 11, 2019, now Pat. No. 11,196,724, which is a continuation of application No. 14/991,687, filed on Jan. 8, 2016, now Pat. No. 10,205,710.

(60) Provisional application No. 62/101,293, filed on Jan. 8, 2015.

(52) U.S. Cl.
CPC .......... *H04L 9/3247* (2013.01); *H04L 63/061* (2013.01); *H04L 63/0823* (2013.01); *H04L 2209/16* (2013.01)

(58) Field of Classification Search
CPC ............. H04L 63/0823; H04L 2209/16; H04L 9/0822; H04L 9/3263; G06F 21/53; G06F 21/602; G06F 21/72; H04W 12/069
See application file for complete search history.

(56) References Cited

U.S. PATENT DOCUMENTS

| | | | |
|---|---|---|---|
| 7,051,005 B1* | 5/2006 | Peinado | H04L 63/0442 713/193 |
| 7,093,129 B1* | 8/2006 | Gavagni | H04L 9/3263 713/153 |
| 7,802,111 B1* | 9/2010 | Tahan | G06F 21/57 713/193 |
| 8,213,620 B1* | 7/2012 | Sussland | H04L 9/0894 380/278 |
| 8,234,387 B2 | 7/2012 | Bradley et al. | |
| 8,245,270 B2* | 8/2012 | Cooperstein | G06F 21/53 713/168 |
| 8,391,494 B1* | 3/2013 | Serenyi | H04L 63/0428 380/278 |
| 8,583,911 B1* | 11/2013 | Miller | H04L 63/0428 713/150 |
| 8,719,590 B1* | 5/2014 | Faibish | G06F 21/602 713/190 |
| 8,762,712 B1* | 6/2014 | Kwan | H04L 9/0825 713/165 |
| 8,776,216 B2 | 7/2014 | Boccon-Gibod et al. | |
| 8,838,974 B2* | 9/2014 | Webb | G06F 21/51 713/168 |
| 8,843,750 B1* | 9/2014 | Sokolov | H04L 63/0823 713/175 |
| 8,966,581 B1* | 2/2015 | Gross | G06F 21/34 726/4 |
| 8,984,285 B1* | 3/2015 | Dorwin | H04N 21/24 713/151 |
| 9,094,206 B2* | 7/2015 | Di Crescenzo | H04L 9/3073 |
| 9,141,769 B1* | 9/2015 | Hitchcock | H04L 9/0877 |
| 9,189,609 B1* | 11/2015 | Antony | G06F 21/10 |
| 9,225,690 B1* | 12/2015 | Fitch | H04L 63/04 |
| 9,246,690 B1* | 1/2016 | Roth | G06F 21/53 |
| 9,251,334 B1* | 2/2016 | Molitor | H04L 9/3271 |
| 9,367,697 B1* | 6/2016 | Roth | H04L 9/0897 |
| 9,515,996 B1* | 12/2016 | Juels | H04L 63/0428 |
| 9,584,517 B1* | 2/2017 | Roth | G06F 21/602 |
| 9,652,631 B2* | 5/2017 | Novak | H04L 9/3247 |
| 9,690,941 B2* | 6/2017 | Thom | G06F 21/6209 |
| 9,692,741 B1* | 6/2017 | Vilhuber | H04L 63/0823 |
| 9,754,116 B1* | 9/2017 | Roth | G06F 21/602 |
| 9,767,271 B2* | 9/2017 | Ghose | G06F 21/52 |
| 9,785,489 B1* | 10/2017 | Chheda | G06F 9/45558 |
| 9,887,836 B1* | 2/2018 | Roth | H04L 9/088 |
| 9,910,997 B1* | 3/2018 | Brail | G06F 21/44 |
| 10,079,681 B1* | 9/2018 | Roth | H04L 47/70 |
| 10,187,363 B2* | 1/2019 | Smirnoff | H04L 9/0897 |
| 10,554,475 B2* | 2/2020 | Weinstein | G06F 21/53 |
| 10,757,082 B2* | 8/2020 | Buendgen | H04L 9/0897 |
| 11,748,492 B1* | 9/2023 | Campagna | H04L 9/0637 713/150 |
| 2002/0023212 A1* | 2/2002 | Proudler | H04L 63/08 714/E11.204 |
| 2002/0162104 A1* | 10/2002 | Raike | H04L 9/083 380/282 |
| 2002/0172367 A1 | 11/2002 | Mulder et al. | |
| 2003/0194085 A1* | 10/2003 | Dillaway | G06F 21/6209 380/29 |
| 2004/0025036 A1* | 2/2004 | Balard | G06F 21/575 713/176 |
| 2004/0255137 A1* | 12/2004 | Ying | H04L 63/0884 713/193 |
| 2005/0069138 A1* | 3/2005 | de Jong | G06F 9/3017 380/278 |
| 2005/0086479 A1* | 4/2005 | Ondet | G06F 21/10 713/172 |
| 2005/0114683 A1* | 5/2005 | Jin | G06F 21/14 713/187 |
| 2007/0040021 A1* | 2/2007 | Nakayma | G06F 12/1408 235/382 |
| 2007/0086586 A1* | 4/2007 | Jakubowski | H04L 9/002 380/28 |
| 2007/0160203 A1* | 7/2007 | Sudhakar | H04L 9/3263 380/30 |
| 2008/0056501 A1* | 3/2008 | McGough | H04L 63/08 380/282 |
| 2008/0063201 A1* | 3/2008 | Wormald | H04L 63/0823 380/255 |
| 2008/0065886 A1* | 3/2008 | McGough | H04L 63/061 713/168 |
| 2008/0080708 A1* | 4/2008 | McAlister | H04L 9/0844 380/44 |
| 2008/0152144 A1* | 6/2008 | Douguet | H04L 9/3236 380/277 |
| 2008/0181412 A1* | 7/2008 | Acar | G06F 21/79 380/279 |
| 2008/0192937 A1* | 8/2008 | Challener | H04L 9/14 380/278 |
| 2008/0229117 A1* | 9/2008 | Shin | G06F 21/72 713/190 |
| 2008/0232598 A1* | 9/2008 | Vennelakanti | G06F 21/62 380/279 |
| 2008/0301470 A1* | 12/2008 | Green | G06F 21/6218 713/193 |
| 2008/0313743 A1* | 12/2008 | Chan | G06F 21/105 726/28 |
| 2009/0097660 A1* | 4/2009 | Malaviarachchi | G06Q 20/3829 380/279 |
| 2009/0103726 A1* | 4/2009 | Ahmed | H04L 9/12 380/46 |
| 2009/0138708 A1* | 5/2009 | Miyazaki | H04L 63/04 713/168 |
| 2009/0150681 A1* | 6/2009 | Kaabouch | H04L 9/14 713/193 |
| 2009/0158035 A1* | 6/2009 | Stultz | H04L 63/0442 713/160 |
| 2009/0169013 A1* | 7/2009 | Fascenda | G06F 21/72 380/277 |
| 2009/0296941 A1* | 12/2009 | Devanand | H04L 63/0428 380/281 |
| 2010/0058047 A1* | 3/2010 | Medvinsky | H04L 9/321 713/189 |
| 2010/0082987 A1* | 4/2010 | Thom | G06F 21/34 713/171 |
| 2010/0146292 A1* | 6/2010 | Shi | H04L 9/3263 713/189 |
| 2010/0146293 A1* | 6/2010 | Shi | G06F 21/10 713/189 |
| 2010/0146501 A1* | 6/2010 | Wyatt | G06F 21/84 718/1 |
| 2010/0174919 A1* | 7/2010 | Ito | G06F 21/74 713/192 |
| 2010/0223456 A1* | 9/2010 | Schneider | H04L 63/0428 380/277 |
| 2010/0293049 A1 | 11/2010 | Maher et al. | |

(56) References Cited

U.S. PATENT DOCUMENTS

| | | | |
|---|---|---|---|
| 2010/0318786 A1* | 12/2010 | Douceur | H04L 63/123 713/155 |
| 2011/0010547 A1* | 1/2011 | Noda | H04L 9/321 713/168 |
| 2011/0085667 A1* | 4/2011 | Berrios | H04L 9/3249 709/203 |
| 2011/0179268 A1* | 7/2011 | Strom | H04L 9/3247 713/168 |
| 2011/0261964 A1* | 10/2011 | Kahler | H04L 9/083 380/44 |
| 2011/0314271 A1 | 12/2011 | Boccon-Gibod et al. | |
| 2012/0042170 A1* | 2/2012 | Curtin | G06F 21/77 713/185 |
| 2012/0140923 A1* | 6/2012 | Lee | H04L 9/0894 380/44 |
| 2012/0159148 A1* | 6/2012 | Behren | G06Q 20/3823 713/150 |
| 2012/0159178 A1* | 6/2012 | Lin | H04L 63/065 713/176 |
| 2012/0166807 A1* | 6/2012 | Shear | G06F 21/51 713/176 |
| 2012/0173877 A1* | 7/2012 | Pendakur | H04N 21/43635 713/169 |
| 2012/0179902 A1* | 7/2012 | Noda | H04L 63/06 713/153 |
| 2012/0192283 A1* | 7/2012 | Gu | H04L 9/002 726/26 |
| 2012/0246487 A1* | 9/2012 | Gu | G06F 21/14 713/190 |
| 2012/0297200 A1* | 11/2012 | Thom | G06F 21/602 713/189 |
| 2012/0328106 A1* | 12/2012 | Dellow | G06F 21/73 380/283 |
| 2013/0091353 A1* | 4/2013 | Zhang | H04L 9/3268 713/156 |
| 2013/0124862 A1* | 5/2013 | Pestoni | G06F 21/121 713/168 |
| 2013/0151848 A1* | 6/2013 | Baumann | H04L 9/3263 713/164 |
| 2013/0152180 A1* | 6/2013 | Nair | G06F 21/575 726/26 |
| 2013/0166906 A1* | 6/2013 | Swaminathan | H04N 21/8456 713/162 |
| 2013/0166923 A1* | 6/2013 | Tsuhara | G06F 3/0605 713/193 |
| 2013/0318577 A1* | 11/2013 | Bulusu | H04W 12/08 726/5 |
| 2014/0003608 A1* | 1/2014 | MacMillan | H04L 9/3239 380/279 |
| 2014/0013109 A1* | 1/2014 | Yin | H04W 12/068 713/155 |
| 2014/0089658 A1* | 3/2014 | Raghuram | G06F 9/45533 380/278 |
| 2014/0095867 A1* | 4/2014 | Smith | H04L 63/0861 713/164 |
| 2014/0108805 A1* | 4/2014 | Smith | H04L 9/3247 713/176 |
| 2014/0129844 A1* | 5/2014 | Johnson | G06F 21/78 713/189 |
| 2014/0140504 A1* | 5/2014 | Karroumi | H04L 9/0861 380/44 |
| 2014/0140508 A1* | 5/2014 | Kamath | H04L 9/0822 380/255 |
| 2014/0164790 A1* | 6/2014 | Dodgson | G06Q 10/10 713/193 |
| 2014/0181518 A1* | 6/2014 | Kim | G06F 9/54 713/168 |
| 2014/0195690 A1* | 7/2014 | Harrison | H04L 67/141 709/227 |
| 2014/0195804 A1* | 7/2014 | Hursti | H04L 9/0863 713/168 |
| 2014/0195807 A1* | 7/2014 | Bar-El | H04L 9/0877 713/168 |
| 2014/0229729 A1* | 8/2014 | Roth | G06F 21/602 713/153 |
| 2014/0229732 A1* | 8/2014 | Roth | H04L 63/0428 713/167 |
| 2014/0229737 A1* | 8/2014 | Roth | H04L 9/088 713/176 |
| 2014/0230007 A1* | 8/2014 | Roth | G06F 21/602 726/1 |
| 2014/0237239 A1* | 8/2014 | Hursti | H04L 9/32 713/168 |
| 2014/0237252 A1* | 8/2014 | Hursti | H04L 9/30 713/176 |
| 2014/0237255 A1* | 8/2014 | Martin | G06F 21/10 713/182 |
| 2014/0281481 A1* | 9/2014 | Moroney | H04N 21/26613 713/151 |
| 2014/0281483 A1* | 9/2014 | Vigliaturo | H04L 63/0471 713/153 |
| 2014/0289535 A1* | 9/2014 | Gan | H04L 9/32 713/189 |
| 2014/0321646 A1* | 10/2014 | Ksontini | H04W 4/60 380/247 |
| 2014/0359288 A1* | 12/2014 | Jensen | H04W 12/04 713/168 |
| 2014/0365763 A1* | 12/2014 | Manohar | G06F 21/53 713/156 |
| 2015/0026483 A1* | 1/2015 | Jiang | G06F 21/10 713/190 |
| 2015/0052358 A1* | 2/2015 | Udupi | H04L 9/0822 713/171 |
| 2015/0058629 A1* | 2/2015 | Yarvis | H04L 9/0825 713/171 |
| 2015/0143117 A1* | 5/2015 | Freeman | H04L 67/1097 713/168 |
| 2015/0149772 A1* | 5/2015 | Leavy | H04L 63/06 713/168 |
| 2015/0150084 A1* | 5/2015 | Kiperberg | G06F 21/44 726/3 |
| 2015/0161382 A1* | 6/2015 | Boivie | G06K 19/06112 726/28 |
| 2015/0199528 A1* | 7/2015 | Bobinski | G06F 8/61 713/191 |
| 2015/0229471 A1* | 8/2015 | Nair | H04L 9/0891 713/171 |
| 2015/0248668 A1* | 9/2015 | Radu | G06Q 20/322 705/71 |
| 2015/0270951 A1* | 9/2015 | Michiels | H04L 63/1466 380/28 |
| 2015/0270956 A1* | 9/2015 | Basmov | G06F 21/74 713/189 |
| 2015/0278531 A1* | 10/2015 | Smith | H04L 63/0428 713/165 |
| 2015/0312223 A1* | 10/2015 | Michiels | G06F 21/51 713/168 |
| 2015/0332262 A1* | 11/2015 | Lingappa | G06Q 20/3823 705/71 |
| 2016/0006724 A1* | 1/2016 | Vlot | G06F 21/72 713/156 |
| 2016/0036826 A1* | 2/2016 | Pogorelik | G06F 21/10 726/1 |
| 2016/0057619 A1* | 2/2016 | Lopez | G06Q 20/3829 380/247 |
| 2016/0063219 A1* | 3/2016 | Vlot | H04L 63/0464 713/168 |
| 2016/0080144 A1* | 3/2016 | Choi | H04L 9/0822 380/44 |
| 2016/0092696 A1* | 3/2016 | Guglani | G06F 21/606 726/26 |
| 2016/0125180 A1* | 5/2016 | Smith | H04L 9/0822 726/20 |
| 2016/0127351 A1* | 5/2016 | Smith | G06F 21/316 726/10 |
| 2016/0134623 A1* | 5/2016 | Roth | H04L 63/0823 713/156 |

(56) References Cited

U.S. PATENT DOCUMENTS

| | | | | |
|---|---|---|---|---|
| 2016/0164849 A1* | 6/2016 | Smith | H04L 9/3263 | |
| | | | 713/155 | |
| 2016/0180066 A1* | 6/2016 | Michiels | H04L 9/0631 | |
| | | | 713/189 | |
| 2016/0182227 A1* | 6/2016 | Michiels | H04L 9/06 | |
| | | | 380/28 | |
| 2016/0182472 A1* | 6/2016 | Michiels | H04L 63/0876 | |
| | | | 713/171 | |
| 2016/0182499 A1* | 6/2016 | Sharaga | G06F 21/82 | |
| | | | 713/156 | |
| 2016/0191236 A1* | 6/2016 | Smirnoff | H04L 9/0822 | |
| | | | 713/171 | |
| 2016/0205074 A1* | 7/2016 | Mitchell | H04L 63/045 | |
| | | | 713/171 | |
| 2016/0226661 A1* | 8/2016 | Keidar | H04L 9/3231 | |
| 2016/0261592 A1* | 9/2016 | Hubert | G06F 21/53 | |
| 2016/0315917 A1* | 10/2016 | Smith | H04L 63/10 | |
| 2017/0048206 A1* | 2/2017 | Sui | H04L 63/0281 | |
| 2017/0063811 A1* | 3/2017 | Hitchcock | H04L 9/3234 | |
| 2017/0116438 A1* | 4/2017 | Ekberg | H04L 63/0876 | |
| 2017/0187524 A1* | 6/2017 | Furukawa | H04L 9/0844 | |
| 2017/0213027 A1* | 7/2017 | Gu | G06F 21/556 | |
| 2017/0228525 A1* | 8/2017 | Wajs | H04L 9/3226 | |
| 2017/0237551 A1* | 8/2017 | Van Foreest | G06F 21/10 | |
| | | | 713/189 | |
| 2017/0243000 A1* | 8/2017 | Shraim | H04L 9/00 | |
| 2017/0286141 A1* | 10/2017 | Adler | G06F 9/4856 | |
| 2017/0288874 A1* | 10/2017 | Narendra Trivedi | G06F 9/45533 | |
| 2017/0310647 A1* | 10/2017 | Hu | G06F 21/33 | |
| 2017/0330402 A1* | 11/2017 | Menard | G07C 9/00857 | |
| 2017/0373828 A1* | 12/2017 | Michiels | G06F 21/75 | |
| 2018/0150646 A1* | 5/2018 | Roth | H04L 63/20 | |
| 2019/0095617 A1* | 3/2019 | Stefan | G06F 8/75 | |
| 2019/0312718 A1* | 10/2019 | Michiels | G06F 21/75 | |
| 2020/0044837 A1* | 2/2020 | Bos | H04W 12/041 | |
| 2021/0111884 A1* | 4/2021 | Nagao | H04L 9/0861 | |
| 2021/0390189 A1* | 12/2021 | Nagao | H04L 9/3247 | |
| 2022/0094536 A1* | 3/2022 | Nilsson | H04L 9/3263 | |

OTHER PUBLICATIONS

International Search Report and Written Opinion dated May 3, 2016, received in PCT Application No. PCT/US2016/012726 (7 pages).

Notice of Allowance and Fee(s) Due mailed Oct. 11, 2018, received in U.S. Appl. No. 14/991,687.

Office Action mailed Aug. 11, 2017, received in U.S. Appl. No. 14/991,687.

* cited by examiner

CRYPTOGRAPHIC SYSTEMS AND METHODS

RELATED APPLICATIONS

This application is a continuation of U.S. Nonprovisional application Ser. No. 17/530,009 filed Nov. 18, 2021, which is a continuation of U.S. Nonprovisional application Ser. No. 16/245,447, filed Jan. 11, 2019 (now U.S. Pat. No. 11,196,724), and entitled "CRYPTOGRAPHIC SYSTEMS AND METHODS," which is a is a continuation of U.S. Nonprovisional application Ser. No. 14/991,687, filed Jan. 8, 2016 (now U.S. Pat. No. 10,205,710), and entitled "CRYPTOGRAPHIC SYSTEMS AND METHODS," which claims the benefit of priority under 35 U.S.C. § 119(e) to U.S. Provisional Patent Application No. 62/101,293, filed Jan. 8, 2015, and entitled "CRYPTOGRAPHIC SYSTEMS AND METHODS," all of which are hereby incorporated by reference in their entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

The present disclosure relates generally to systems and methods for performing cryptographic operations. More specifically, but not exclusively, the present disclosure relates to systems and methods that use cryptographic techniques to protect secure information shared with a potentially untrusted execution environment associated with a software application.

Conventional cryptographic services implemented within browser software of a client system may be vulnerable to certain attacks. For example, a server provisioning a cryptographic implementation to browser software of a client system and/or a communication channel associated with the same may be compromised (e.g., via a man-in-the-middle attack or the like). In view of these potential vulnerabilities, a user of a client system may be unwilling to provide certain secure user keys or other sensitive data to cryptographic implementations and/or other data processing methods operating within browser software downloaded from an untrusted server. Similarly, a server may be unwilling to provide certain secure server keys to browser software of an untrusted client system.

Certain embodiments of the systems and methods disclosed herein provide for secure implementation of cryptographic services including trusted credential and/or key management services operating within browser software executing on a client system. In some embodiments, a user may trust their secure keys to a cryptographic implementation operating within browser software based on the cryptographic service being signed and/or otherwise protected or authenticated by a trusted service (e.g., a trusted third party cryptographic service or the like). Similarly, a server may trust its secure keys to a cryptographic implementation operating within the browser software of a client system. In certain embodiments, the disclosed systems and methods may enable trusted credential and/or secure user key management within a sandboxed area of the client system associated with the browser software, thereby protecting the integrity of the trusted credentials and/or secure keys.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
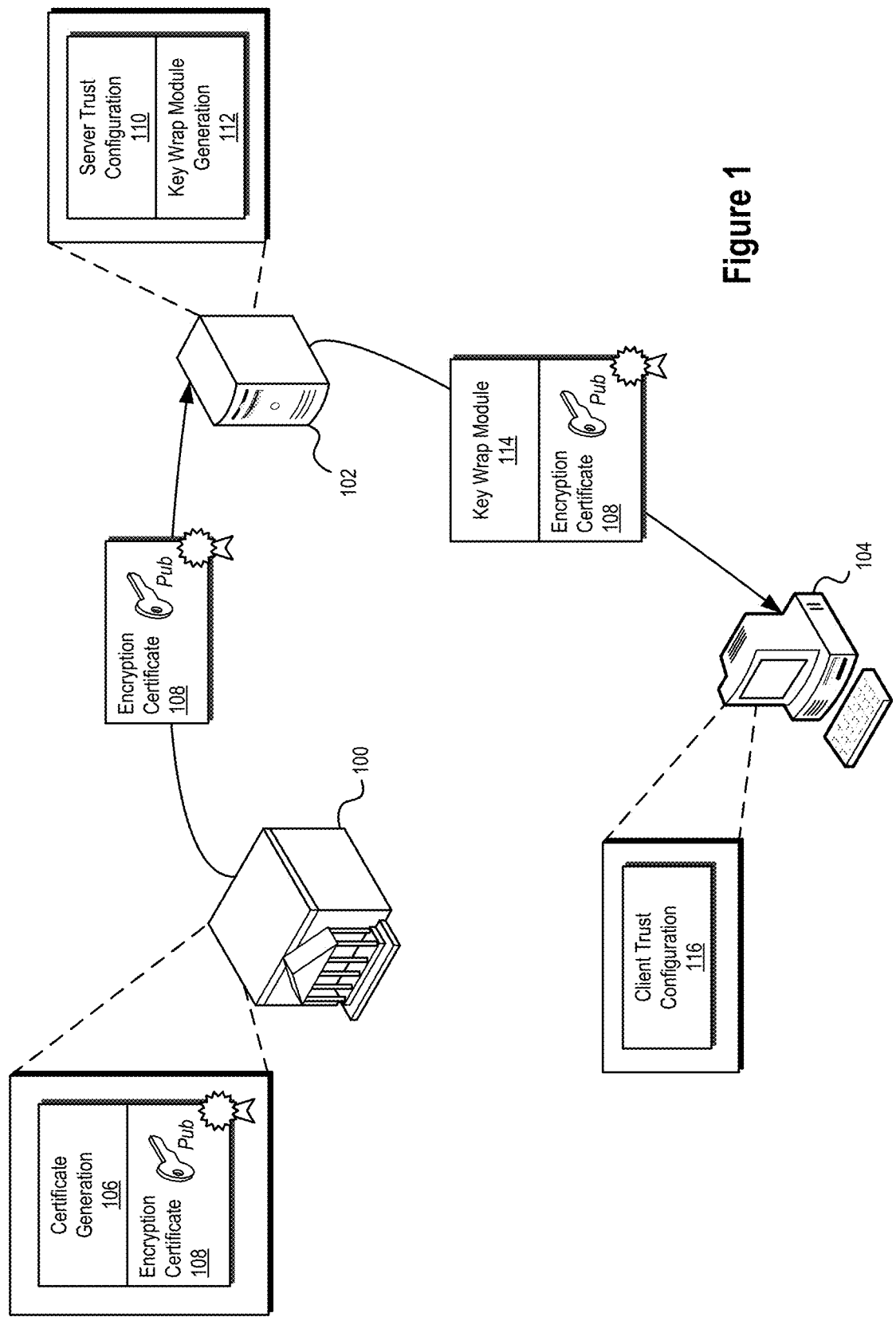
FIG. 1 illustrates a trust configuration process consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Some embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of certain illustrative embodiments is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the systems and methods disclosed herein may employ trusted key management in connection with cryptographic services implemented within browser software executing on a client system. In certain embodiments, the systems and methods may use a trusted service operating as a root-of-trust. Credentials (e.g., certificates, keys, and/or the like) may be provisioned by the trusted service to client and/or server systems for use in connection with protecting the security of keys used in cryptographic operations performed by a protected client module executing within browser software of the client system (e.g., a JavaScript application and/or the like). In certain embodiments, the protected client module may be protected using a variety of cryptographic and/or white-box cryptographic techniques employed by the trusted service. Using such an architecture, the integrity of keys shared by a user of client system and/or the server system with the protected client module may be maintained. Although certain embodiments disclosed herein are discussed in connection with client modules executing within browser software of a client system, it will be appreciated that the disclosed embodiments may be further employed in connection with any other type of software and/or execution environments and in a variety of configurations and/or architectures.

In certain embodiments, the systems and methods described herein can, for example, be used in connection with digital rights management ("DRM") technologies such as those described in commonly assigned, co-pending U.S. patent application Ser. No. 11/583,693 ("the '693 application"), service orchestration technologies such as those described in commonly assigned co-pending U.S. patent application Ser. No. 10/863,551 ("the '551 application"), and/or content delivery technologies such as those described in commonly assigned co-pending U.S. patent application Ser. No. 12/785,406 ("the '406 application") (the contents of '693 application, the '551 application, and the '406 application hereby being incorporated by reference in their entireties), as well as in other contexts. It will be appreciated that these systems and methods are novel, as are many of the components, systems, and methods employed therein.

FIG. 1 illustrates a trust configuration process consistent with embodiments disclosed herein. In certain embodiments, a trusted service 100 may interact with a server system 102 and/or a client system 104 in connection with a trust configuration process. The trusted service 100, the server system 102, the client system 104, and/or other services and/or systems (not shown) used in connection with the disclosed embodiments may comprise any suitable computing system or combination of systems configured to implement embodiments of the systems and methods disclosed herein. In certain embodiments, the trusted service 100, the server system 102, the client system 104, and/or other systems or services may comprise at least one processor system configured to execute instructions stored on an associated non-transitory computer-readable storage medium. As discussed in more detail below, the trusted service 100, the server system 102, the client system 104, and/or other systems or services may further comprise a secure processing unit ("SPU") configured to perform sensitive operations such as trusted credential and/or key management, secure policy management, and/or other aspects of the systems and methods disclosed herein. The trusted service 100, the server system 102, and/or the client system 104, and/or other services or systems may further comprise software and/or hardware configured to enable electronic communication of information between the devices and/or systems via one or more associated network connections.

The client system 104 may comprise a computing device executing one or more applications configured to implement certain embodiments of the systems and methods disclosed herein. In certain embodiments, the client system 104 may comprise a laptop computer system, a desktop computer system, a smartphone, a tablet computer, and/or any other computing system and/or device that may be utilized in connection with the disclosed systems and methods. In some embodiments, the client system 104 may comprise software and/or hardware configured to, among other things, implement cryptographic operations using software executing within browser software of the client system 104 and/or a sandboxed environment associated with the same. As discussed in more detail below, in some embodiments, such cryptographic functionality may be implemented using, at least in part, one or more protected applications (e.g., client modules) executing within a browser of the client system 104.

Communication between the client system 104, server system 102, trusted service 100, and/or one or more other service providers may be facilitated by a network comprising any suitable number of networks and/or network connections. The network connections may comprise a variety of network communication devices and/or channels and may utilize any suitable communication protocols and/or standards facilitating communication between the connected devices and systems. The network connections may comprise the Internet, a local area network, a virtual private network, and/or any other communication network utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards, Bluetooth®, ultra-wide band ("UWB"), Zigbee®, and or any other suitable communication protocol(s).

As part of the trust configuration process, the trusted service 100 may generate and issue one or more trusted credentials to the server system 102 and/or the client system 104. In certain embodiments, a trusted credential may comprise a certificate including one or more cryptographic components. For example, as illustrated, the trusted service 100 may generate an encryption certificate 108 that includes a cryptographic key using a certificate generation module 106. In some embodiments, the cryptographic key included in the encryption certificate 108 may be a public cryptographic key. Although embodiments disclosed herein are discussed in connection with a trusted credential that comprises an encryption certificate 108 including a public key, it will be appreciated that any suitable trusted credential may be used in connection with the disclosed embodiments. As discussed in more detail below, the encryption certificate 108 may be used in connection with facilitating trust between a server system 102, a client system 104, and/or a module executing on the same (e.g., a script executing in browser software and/or the like)

The encryption certificate 108 may be communicated to the server system 102 and/or the client system 104. In certain embodiments, the encryption certificate 108 may be issued to the server system 102 from the trusted service 100, which may in turn issue the encryption certificate 108 to the client system 104. In other embodiments, the encryption certificate 108 may be issued to the client system 104 by the trusted service 100 directly and/or via one or more other intermediate services and/or systems. Similarly, the encryption certificate 108 may be issued to the server system 102 via one or more intermediate services and/or systems.

Upon receiving the encryption certificate 108, the server system 102 may use the encryption certificate 108 in connection with a server trust configuration process 110. In certain embodiments, the encryption certificate 108 may be loaded in a trusted certificate library maintained by the server system 102 as part of the server trust configuration process 110 for use in connection with future trusted and/or cryptographic operations. In certain embodiments, prior to committing secret information to the trusted service 100, the server system 102 may verify that the trusted service 100 is trusted as part of the server trust configuration process 110. Trust may be verified and/or otherwise established in a variety of suitable ways. For example, trust may be verified and/or otherwise established by determining that the trusted service 100 meets trust and/or security requirements articulated by the server system 102 and/or another service. After trust has been verified and/or established, the encryption certificate 108 may be used by the server system 102 to encrypt information in connection with the disclosed embodiments.

The server system 102 may generate a key wrap module 112 as part of a key wrap module generation process 112. In certain embodiments, the key wrap module 112 may use the encryption certificate 108 to perform a key wrapping operation. In some embodiments, the key wrap module 114 may be used to encapsulate cryptographic keys, thereby protecting wrapped cryptographic keys while in untrusted storage and/or during transmission over untrusted communication channels. In certain embodiments, the key wrap module 114 may comprise an asymmetric encryption algorithm that utilizes the public key included in the encryption certificate 108 to wrap and/or otherwise protect a cryptographic key. In some embodiments, the key wrap module 114 may be configured to perform a key wrapping operation using an RSA encryption algorithm, although other suitable key wrapping algorithms and/or processes may also be used in connection with the disclosed embodiments. Although in the illustrated embodiments the key wrap module 112 is shown as being generated and distributed by the server system 102, it will be appreciated that the key wrap module 112 may be generated and distributed by the trusted service 100 and/or one or more other services.

In some embodiments, the encryption certificate 108 may be separate from the key wrap module 114 and may be accessed by the key wrap module 114 in connection with key wrapping operations (e.g., from a certificate library and/or the like). In other embodiments, the encryption certificate 108 may be included as a component within the key wrap module 114.

The key wrap module 114 and/or the encryption certificate 108 may be transmitted to the client system 104 for use in connection with key wrapping and/or other cryptographic operations. In certain embodiments, upon receiving the encryption certificate 108, the client system 104 may use the encryption certificate 108 in connection with a client trust configuration process 116. In certain embodiments, prior to committing secret information to the trusted service 100 and/or modules and/or applications protected by the same, the client system 104 may verify that the trusted service 100 is trusted as part of the client trust configuration process 116. Trust may be verified and/or otherwise established in a variety of suitable ways. For example, trust may be verified and/or otherwise established by determining that the trusted service 100 meets trust and/or security requirements articulated by the client system 104 and/or another service. After trust has been verified and/or established, the encryption certificate 108 may be used by the client system 104 to encrypt information in connection with the disclosed embodiments.

In certain embodiments, the encryption certificate 108 may be loaded in a trusted certificate library maintained by the client system 104 as part of the user trust configuration process 116 for use in connection with future trusted and/or cryptographic operations. Similarly, the key wrap module 114 may be loaded into one or more cryptographic libraries of the client system 104 for use in connection with trusted and/or cryptographic operations performed by the client system 104.

Various trust configuration processes illustrated in connection with FIG. 1 may be performed at a variety of suitable times. For example, in some embodiments, the server system 102 and/or client system 104 may be provisioned with an encryption certificate 108 and/or key wrap module 114 at a time of manufacture. In other embodiments, various aspects of the trust configuration processes may be performed in connection with a system registration process (e.g., a server and/or client registration process or the like). In yet further embodiments, aspects of the trust configuration processes may be performed when a protected client module is transmitted to a client system 104 from the server system 102 for execution within browser software of the client system 104, as is discussed in more detail below.

Figure 2:
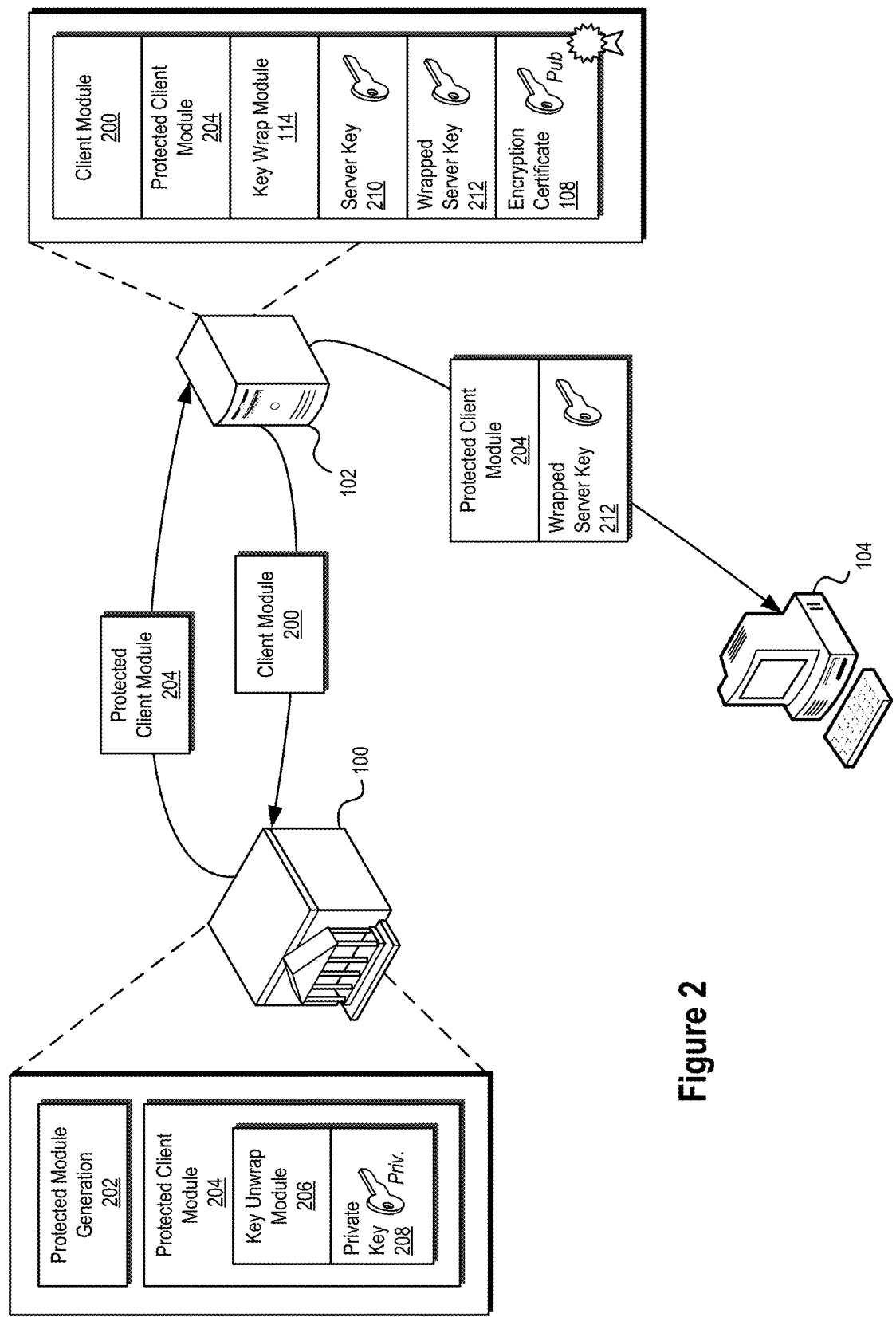
FIG. 2 illustrates a process of provisioning a client system with a protected client module consistent with embodiments disclosed herein.

FIG. 2 illustrates a process of provisioning a client system 104 with a protected client module 204 consistent with embodiments disclosed herein. In certain embodiments, the server system 102 may transmit a client module 200 to the trusted service 100 for protection. In some embodiments, the client module 200 may be generated by the server system 102. In further embodiments, a developer of the client module 200 may transmit the client module 200 to the server system 102 and/or the trusted service 100 for distribution to one or more client systems 104 and/or for protection by the trusted service 100.

The client module 200 may comprise a software application configured to be executed by the client system 104. For example, in some embodiments, the client module 200 may be configured to be executed within browser software of the client system. In some embodiments, the client module 200 may comprise a JavaScript application downloaded to a client system 102 in connection with accessing a webpage using associated browser software. Consistent with embodiments disclosed herein, the client module 200 may implement certain cryptographic operations (e.g., operations using cryptographic keys and/or the like), which may be protected by the trusted service 100.

Upon receipt of the client module 200, the trusted service 100 may engage in a protected module generation process 202. In certain embodiments, the protected module generation process 202 may utilize any suitable software code protection method to yield a protected client module 204 including, for example, white-box cryptographic protection methods, fully homomorphic encryption ("FHE") methods, software obfuscation methods, functional encryption methods, and/or the like. For example, in certain embodiments, white-box protection methods may allow secret information associated with the client module 200 (e.g., secure keys such as a private key) to remain encrypted and/or otherwise protected, even during execution of code associated with the client module 200. In some embodiments, such white-box cryptographic methods may protect software code and/or associated secret information from being exposed in clear text during execution of the module. Among other things, this may allow execution and/or storage of the client module 202 on and/or in a memory of a client system 104 having an open architecture.

In certain embodiments, the protected client module 204 may comprise a key unwrap module 206. The key unwrap module 206 may be configured to unwrap a cryptographic key using a private cryptographic key 208 included in the protected client module 204 to yield a protected cryptographic key (e.g., a white-box protected cryptographic key). For example, in some embodiments, the key unwrap module 206 may receive a cryptographic key wrapped using the public cryptographic key included in the encryption certificate 108 generated and/or provisioned by the trusted service 100 as part of a trust configuration process. The key unwrap module 206 may utilize the private cryptographic key 208 included in the protected client module 204 corresponding to the public key to unwrap the wrapped cryptographic key and yield a protected cryptographic key that may then be used in connection with certain cryptographic operations performed by the protected client module 204. In some embodiments, the private cryptographic key 208 may comprise a white-box protected cryptographic key.

The protected client module 204 may be transmitted to the server system 102 by the trusted service 100 for distribution to one or more client systems 104. The server system 102 may distribute the protected client module 204 to the client system 104 under a variety of circumstances. For example, in some embodiments, the protected client module 204 may comprise a protected JavaScript application. When browser software executing on the client system 104 accesses an associated webpage, the protected JavaScript application may be downloaded by the client system 104 from the server system 102 for execution within an environment associated with the browser software. In some embodiments, the protected JavaScript application may not be permanently installed on the client system 104, but be cached for use during a single and/or over a limited number of sessions and/or period of time.

In some embodiments, the protected client module 204 may perform cryptographic operations utilizing a variety of cryptographic keys. For example, the protected client module 204 may perform a secure cryptographically-enforced transaction between the server system 102 and the client system 104 using keys associated with the server system 102 and/or the client system 104. Similarly, the protected client module 204 may use keys associated with the server system 102 and/or the client system 104 in connection with various web analytics methods, network authentication methods (e.g., Kerberos network authentication protocol methods), financial transaction methods including EMV payments, and/or the like. It will be appreciated that embodiments disclosed herein may also be utilized in connection with protecting secret information used in various non-cryptographic operations performed by the protected client module 204.

In certain embodiments, the server system 102 may not trust the integrity and/or security of the client system 104, and thus may not wish to provide its unencrypted keys to the client system 104 for use in connection with various operations including, for example, cryptographic operations. Accordingly, the server system 102 may use the key wrap module 114 to wrap a server key 210 using the public key included in the encryption certificate 108. After the server key 210 has been wrapped, the wrapped server key 212 may be transmitted to the client system 104 for use in connection with various cryptographic operations performed by the protected client module 204.

Figure 3:
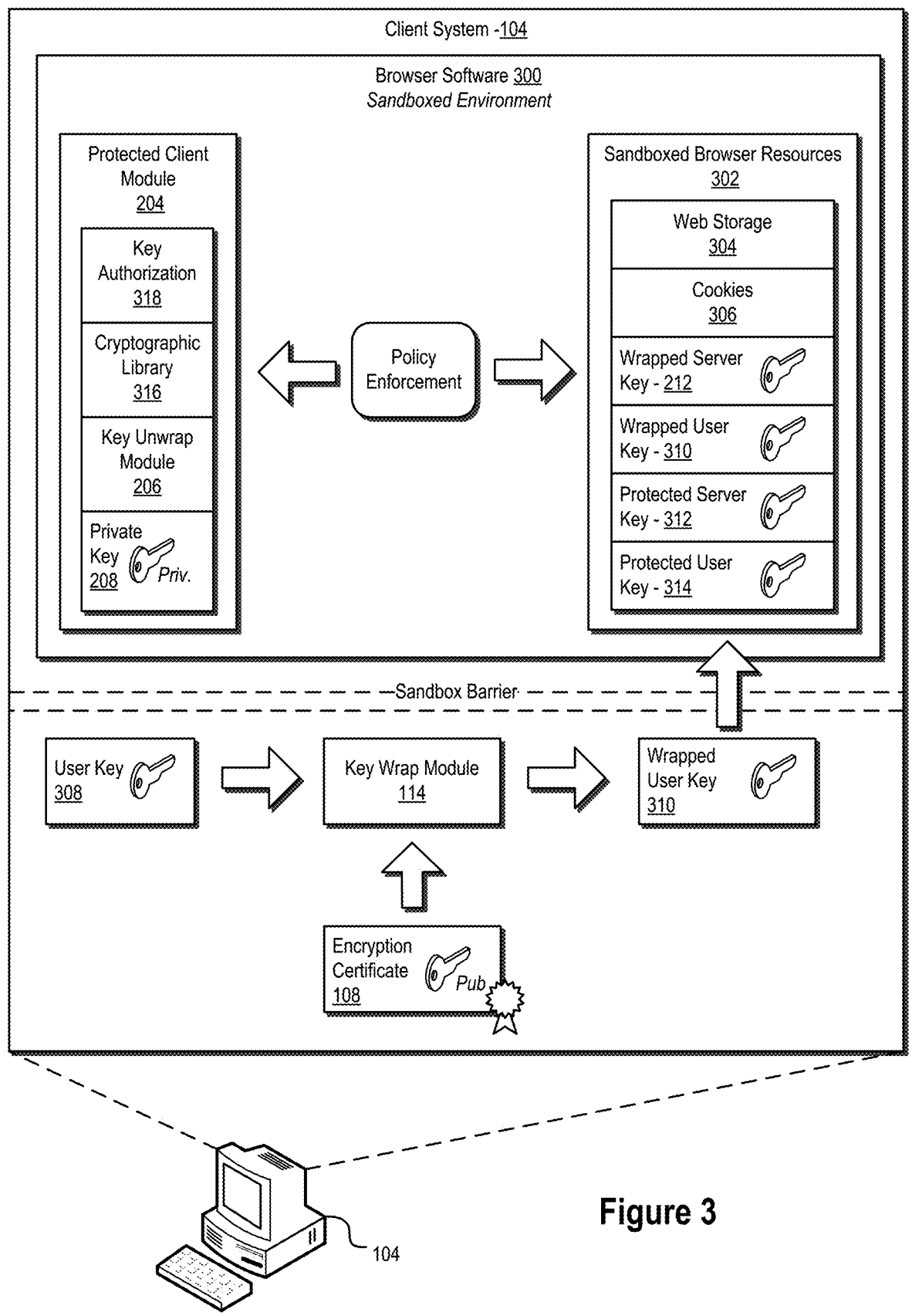
FIG. 3 illustrates an exemplary implementation of a cryptographic service included in browser software executing on a client system consistent with embodiments disclosed herein.

FIG. 3 illustrates an exemplary implementation of a cryptographic service included in browser software 300 executing on a client system 104 consistent with embodiments disclosed herein. In certain embodiments, certain software code executing on the client system 104 may be sandboxed and/or otherwise executed in some type of a limited virtualized environment. Software code executing in a sandbox may be restricted to accessing and/or using a controlled set of resources, functions, and/or services associated with the client system. For example, a sandbox may allow software code executing therein to only access a certain subset of storage disk space and/or memory associated with the client system. Access to certain input/output channels, networking resources, processing resources, and/or the like may be similarly controlled and/or restricted.

In certain embodiments, browser software 300 executing on the client system 104 may be sandboxed, thereby protecting the client system 104 from nefarious code executing within the browser software 300. In certain embodiments, the browser software 300 may have access to defined sandboxed resources 302 of the client system 104. The sandboxed resources 302 may comprise certain portions and/or locations of storage on the client system 104 that may store, for example, cached and/or otherwise stored website information 304, cookies 306, and/or trusted credentials such as keys 312, 310-314. The sandboxed resources 302 may further comprise certain processing resources, functions, services, and/or interfaces of the client system 104 accessible by the browser software 300 and/or modules executing in an environment associated with the same. In other embodiments, the sandboxed resources 302 may comprise a secure clock, a secure random number generator, a secure user interface, and/or the like.

A protected client module 204 may be loaded into the execution environment of the browser software 300 to facilitate implementation of certain cryptographic services within the browser software 300 consistent with embodiments disclosed herein. In certain embodiments, the interaction between the browser software 300 and/or modules executing in the sandboxed environment of the browser software 300 may be managed by one or more articulated policies. For example, in certain embodiments, the protected client module 304 may only be allowed access to sandboxed browser resources 302 associated with the module 304 (e.g., web storage 304, cookies 306, and/or keys 212, 310-314). Similarly, in some embodiments, a same-origin policy may be enforced by the browser software 300 to allow a specific browser application to access cookies and/or other information generated by the application while restricting access to cookies and/or other information generated by other applications. In this manner, the specific resources included in the sandboxed browser resources 302 may vary between various browser-executed applications.

A user of the client system 104 may wish to use a cryptographic key 308 in connection with a cryptographic operation performed by the protected client module 204 executing in the sandboxed environment of the browser software 300. The user, however, may not necessarily trust applications executing within the browser software 300, and thus may not wish to provide their unencrypted user key 308 to the execution environment of the browser software 300. Accordingly, the client system 104 may use a key wrap module 114 provisioned as part of the trust configuration process detailed above to wrap the user key 308 using the public key included in the provisioned encryption certificate 108. In certain embodiments, by wrapping the user key 308 with the public key included in the encryption certificate 108, the client system 104 may limit use of the user key 308 to trusted applications protected by a trusted service.

In certain embodiments, the encryption certificate 108 may also comprise descriptions of various functions and/or permissions relating to how a key wrapped with information included in the encryption certificate 108 (e.g., the public key) will be used by the protected client module 104. In some embodiments, such descriptive information may allow a user of the client system 104 to better determine what operations they are consigning their secret user key 308 to prior to wrapping the key using information included in the encryption certificate 108 and importing the wrapped key 310 into the execution environment associated with the browser software 300. In some embodiments, functions and/or permissions relating to how a key is used by the protected client module 204 and/or other related modules and/or systems may be enforced by a key authorization module 318 included in the protected client module 204 and/or the browser software 300.

After the user key 308 has been wrapped, the resulting wrapped user key 310 may be imported to the execution environment of the browser software 300 for use in connection with cryptographic operations implemented by the protected client module 204. In certain embodiments, the key unwrap module 206 included in the protected client module 204 may be configured to unwrap the wrapped user key 310 using the private cryptographic key 208 provisioned to the protected client module 204 by the trusted service to yield a protected user key 314. In certain embodiments, the protected user key 314 may comprise a white-box protected user key. Accordingly, the protected user key 314 may be exposed outside the sandboxed environment of the browser software 300 (e.g., to a remote server system and/or the like) without compromising the security of the user key. The protected user key 314 may be used in connection with cryptographic operations performed by the protected client module 204 and/or by a remote server system.

Certain cryptographic operations performed by the protected client module 204 may further use a key provided by a server system. For example, certain secure transactions may utilize both a user key and a server key. Accordingly, a wrapped server key 212 sent to the execution environment of the browser software 300 by a server system may further be unwrapped using the key unwrap module 206 included in the protected client module 204 to generate a protected server key 312. Like the protected user key 314, the protected server key 312 may comprise a white-box protected user key. Accordingly, the protected server key 312 may be exposed outside the server system (e.g., to the execution environment of the browser software 300) without compromising the security of the server key.

Key unwrapping consistent with the disclosed embodiments may be performed at a variety of times. For example, in some embodiments, key unwrapping may be performed using the key unwrap module 206 when the wrapped server key 212 and/or the wrapped user key 310 are initially loaded into the execution environment of the browser software 300. In further embodiments, key unwrapping may be performed when keys used in connection with a cryptographic operation are requested by the protected client module 204. In certain embodiments, unwrapped protected keys 312, 314 may be utilized in connection with cryptographic operations performed using a cryptographic library 316 of the protected client module 204. In yet further embodiments, key unwrapping may be included as part of platform and/or service communication methods (e.g., SSL communication methods and/or the like).

Although certain embodiments disclosed herein are discussed in connection with the use of a key wrap module 114 to protect various secret information including user and server keys (e.g., user key 308), it will be appreciated that other protection mechanisms may also be used in connection with the disclosed embodiments. For example, in some embodiments, keys may be communicated to the protected client module 204 via a secure and/or otherwise authenticated communications channel. In some embodiments, the secure and/or authenticated communication channel may protect the keys from being exposed in the clear.

A variety of cryptographic operations may be performed using the protected keys 312, 314. For example, the protected client module 204 may use the protected keys 312, 314 in connection with a secure cryptographically-enforced transaction between a server system and the client system 104. Other cryptographic operations using embodiments of the disclosed systems and methods include, without limitation, data encryption/decryption operations, cryptographic signing operations, cryptographic signature verification operations, and/or the like. In yet further embodiments, the protected keys 312, 314 may be used in a variety of other operations that may not necessarily be cryptographic operations.

In certain embodiments, the protected client module 204 may implement a safe application program interface ("API"). In certain embodiments, the safe API may expose certain defined functions that may not be used to compromise the integrity of secret information imported to the protected client module 204 and/or the associated browser software 300 such as secure keys (e.g., keys 212, 310-314). In certain embodiments, such defined functions may be articulated in metadata and/or other information associated with the keys. For example, in certain embodiments, functions such as unwrapping a wrapped user key 310 and making it directly available may not be exposed by the safe API. In this manner, the integrity of the imported secure user key 310 may be maintained by the protected client module 204. Similarly, specific permitted uses of secure keys 212, 310-314 by the protected client module 204, the browser software 300, and/or other software and/or systems may be enforced by implementation of a safe API, thereby preventing the keys 212, 310-314 from being used in arbitrary ways.

In some embodiments, a safe API may further utilize certain code verification techniques to ensure that the integrity of secret information imported into a protected client module 204 and/or associated browser software is maintained. For example, the safe API may validate the integrity of its inputs and/or perform certain authorization checks. In certain embodiments, the safe API may perform and/or otherwise verify certain key authorizations using any suitable technique (e.g., DRM license checks and/or the like). In some embodiments, this functionality may, among other things, reduce the potential of repeated or rogue activations from detrimentally impacting an overall trust ecosystem and/or its various participants.

In further embodiments, a user of the client system 104 may trust their secure user keys 308 to a trusted service. In certain embodiments, the trusted service may be trusted by the user through assurance and/or auditing of certain security implementations. The trusted service may protect the secret user keys 308 using white-box cryptographic protection methods and may distribute protected user keys 314 to the client system 104. Similarly, a server may trust its keys to the trusted service, which may protect the server keys using white-box cryptographic protection methods and may similarly distribute the protected server keys 312 to the server system and/or the client system. The protected client module 204 executing within the browser software 300 of the client system 104 may then access the protected keys 312, 314 in connection with various operations including, for example, cryptographic operations. In certain embodiments, such an implementation may reduce the burden on the client system 104 and/or a server system associated with performing key wrapping and/or unwrapping operations.

In certain embodiments, the browser software 300 executing on the client system 104 may use Google® Native Client ("NaCl") and/or any other suitable sandboxing technology to facilitate safe execution of native code within an environment associated with the browser software 300. In some embodiments, native code that is written in a defined manner may be executed within the sandboxed environment. In certain embodiments, the defined manner in which the native code is written may be analyzable and verifiable as being secure by the browser software 300 executing the code. For example, native code may be analyzed to determine that the code may only call certain permissible functions. In some embodiments, such an implementation may allow for executing of web-based applications (e.g., a protected client module 204) at near-native speeds on the client system 104.

Embodiments of the disclosed systems and methods may be utilized in connection with a variety of applications. For example, in some embodiments, a protected client module 204 may be utilized in connection with implementing a Kerberos Ticket Granting Service ("TGS"). In some embodiments, various secure resources used in connection with the Kerberos TGS (e.g., a secure random number generator, secure storage, etc.) may be provided by the client system 104 via a trusted SPU and/or the like. In further embodiments, a protected client module 204 may be used in connection with implementing a EMV payment service to, among other things, protect a user's account information (e.g., credit card number) and/or sign payment tokens using associated keys (e.g., symmetric keys).

It will be appreciated that a number of variations can be made to the architecture and relationships presented in connection with FIGS. 1-3 within the scope of the inventive body of work. For example, without limitation, in some embodiments, some or all of the functions performed by the trusted service 100 may be performed by the server system 102. Similarly, some or all of the functions performed by the client system 104 may be performed by the server system 102. Furthermore, one or more other services and/or systems not necessarily illustrated may be utilized in connection with implementing various aspects of the embodiments of the disclosed systems and methods. Although certain embodiments are discussed in connection with protecting secure cryptographic keys, it will be appreciated that the disclosed embodiments may be further used in connection with protecting any suitable secret information including, without limitation, passwords, personal information, sensitive data, and/or the like. Thus it will be appreciated that FIGS. 1-3 are provided for purposes of illustration and explanation, and not limitation.

Figure 4:
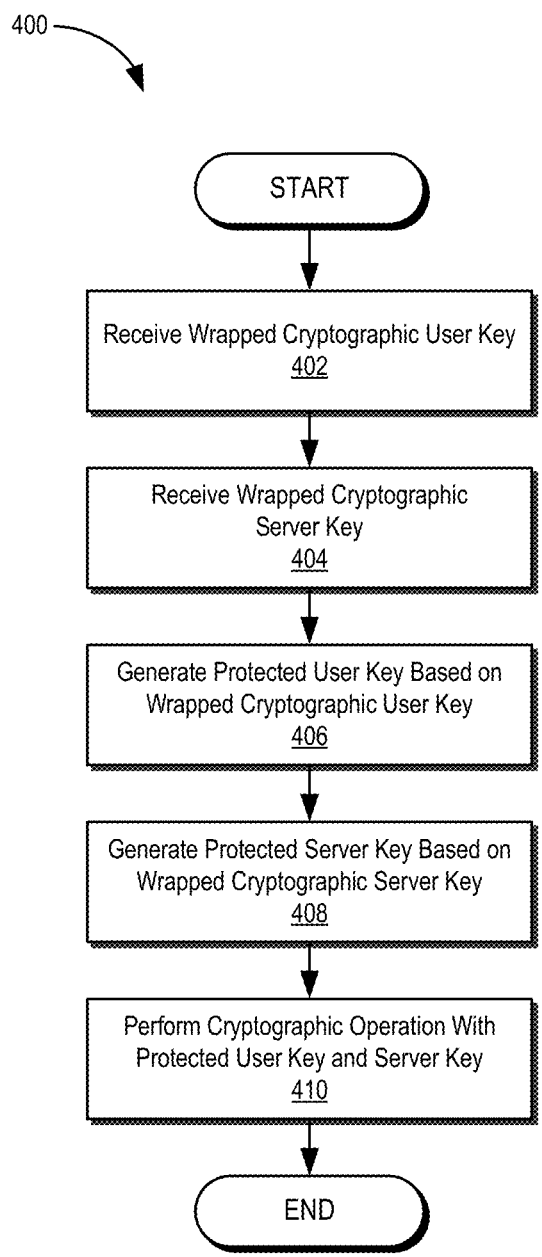
FIG. 4 illustrates a flow chart of an exemplary cryptographic operation consistent with embodiments disclosed herein.

FIG. 4 illustrates a flow chart of an exemplary cryptographic method 400 consistent with embodiments disclosed herein. The illustrated method 400 may be implemented in a variety of ways, including using software, firmware, hardware, and/or any combination thereof. In certain embodiments, various aspects of the method 400 may be implemented by a client system, a server system, a trusted service, and/or any other related service or system as described above. Certain embodiments included in the illustrated method 400 may implement secure cryptographic operations within a sandboxed execution space of browser software executing on a client system. It will be appreciated, however, that embodiments of the disclosed systems and methods may be similarly implemented in a variety of other execution spaces. In addition, it will be appreciated that cryptographic operations consistent with the disclosed embodiments may incorporate all of the elements of the illustrated method 400 or a subset thereof, and may proceed in any suitable order.

At 402, a wrapped user key may be received via an import process in an execution environment associated with browser software. In certain embodiments, the wrapped user key may have been wrapped using a public key included in an encryption certificate provisioned to a client system executing the browser software from a trusted service. A wrapped server key may be similarly received in the execution environments of the browser software at 404. Like the wrapped user key, the wrapped server key may have been wrapped using a public key included in an encryption certificate provisioned to the server system from a trusted service. The wrapped keys may be provided to the execution environment associated with the browser software and/or a protected application executing within the same through a platform API, a cookie, user interaction (e.g., user input via a browser widget or the like), etc.

The wrapped user key may be unwrapped by a component of a protected application such as a key unwrapping module executing within the execution environment of the browser software at 406. In certain embodiments, the wrapped user key may be unwrapped using, at least in part, a private key provisioned to the protected application from the trusted service corresponding to the public key included in the encryption certificate used to wrap the user key. Unwrapping the wrapped user key may generate a white-box protected user key.

At 408, the wrapped server key may be unwrapped by the key unwrapping module of the protected application executing within the execution environment of the browser software. Like the wrapped user key, the wrapped server key may be unwrapped using, at least in part, a private key provisioned to the protected application from the trusted service corresponding to the public key included in the encryption certificate used to wrap the server key. Unwrapping the wrapped server key may generate a white-box protected server key.

A cryptographic operation may be performed by the protected client module using the generated protected server and/or user keys at 410. In certain embodiments, the security of the user and/or server keys may be maintained, as the corresponding protected cryptographic keys used in connection with the cryptographic operation may remain white-box protected in the execution space of the browser application and/or elsewhere that they may be sent in connection with the operation. Accordingly, a user of the client system and/or the server system may be more willing to import wrapped representations of their secure keys into the otherwise potentially untrusted execution space of the browser software.

Figure 5:
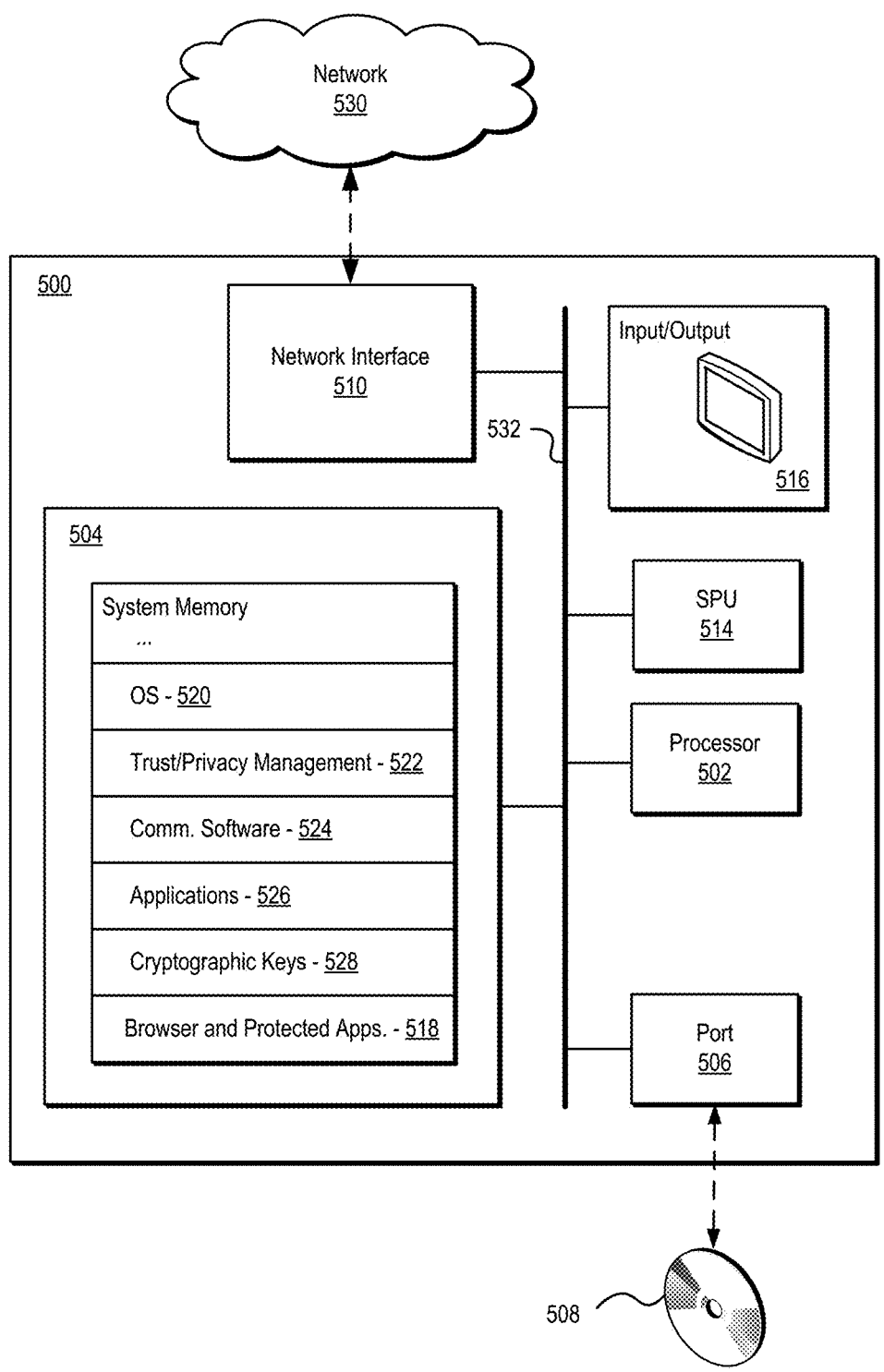
FIG. 5 illustrates a system that may be used to implement certain embodiments of the systems and methods of the present disclosure.

FIG. 5 illustrates a system 500 that may be used to implement certain embodiments of the systems and methods of the present disclosure. The system 500 may comprise a trusted service, a server system, a client system, and/or any other system configured to implement certain aspects the systems and methods described herein. In certain embodiments, the system 500 may perform some or all of the disclosed functions associated with a trusted service, a server system, a client system, and/or any other related system and/or service as disclosed herein.

As illustrated in FIG. 5, the system 500 may include: a processor 502; system memory 504, which may include high speed RAM, non-volatile memory and/or one or more bulk non-volatile computer-readable storage mediums (e.g., a hard disk, flash memory, etc.) for storing programs and other data for use and execution by the processor 502; an interface 516 (e.g., an input/output interface) that may include a display and/or one or more input devices such as, for example, a touchscreen, a keyboard, a mouse, a track pad, and the like; a port 506 for interfacing with removable memory 508 that may include one more diskettes, optical storage mediums, and/or other computer-readable storage mediums (e.g., flash memory, thumb drives, USB dongles, compact discs, DVDs, etc.); a network interface 510 for communicating with other systems via a network 530 using one or more communication technologies; and one or more buses 532 for communicatively coupling the aforementioned elements.

In certain embodiments, the network 530 may comprise the Internet, a local area network, a virtual private network, and/or any other communication network utilizing one or more electronic communication technologies and/or standards (e.g., Ethernet or the like). In some embodiments, the network interface 510 and/or network 530 may be part of a wireless carrier system, such as a PCS, and/or any other suitable communication system incorporating any suitable communication standards and/or protocols. In further embodiments, the network interface 510 and/or the network 530 may be part of an analog mobile communications network and/or a digital mobile communications network utilizing, for example, CDMA, GSM, FDMA, and/or TDMA standards. In still further embodiments, the network interface 510 and/or the network 530 may incorporate one or more satellite communication links and/or use IEEE's 802.11 standards, near-field communication, Bluetooth®, UWB, Zigbee®, and or any other suitable standard or standards.

In some embodiments, the system 500 may, alternatively or in addition, include a SPU 514 that is protected from tampering by a user of system 500 or other entities by utilizing secure physical and/or virtual security techniques. An SPU 514 can help enhance and/or facilitate the security of sensitive operations such as private management of secret or otherwise secure information including cryptographic keys, and other aspects of the systems and methods disclosed herein. In certain embodiments, the SPU 514 may operate in a logically secure processing domain and be configured to protect and operate on secret information. In some embodiments, the SPU 514 may include internal memory storing executable instructions or programs configured to enable to the SPU 514 to perform secure operations. In further embodiments, the SPU 514 may facilitate certain secure platform resources including, without limitation, secure random number generators, secure clocks, secure user interfaces, secure storage, and/or the like.

The operation of system 500 may be generally controlled by the processor 502 operating by executing software instructions and programs stored in the system memory 504 (and/or other computer-readable media, such as removable memory 508). The system memory 504 may store a variety of executable programs or modules for controlling the operation of the system 500. For example, the system memory 504 may include an operating system ("OS") 520 that may manage and coordinate, at least in part, system hardware resources and provide for common services for execution of various applications and a trust and privacy management system 522 for implementing trust and privacy management functionality including protection and/or management of secret information. The system memory 504 may further include, without limitation, communication software 524 configured to enable in part communication with and by the system 500, applications 526, cryptographic keys 528 (e.g., wrapped keys, protected keys, etc.), browser software and/or protected applications and/or client modules 518 configured to execute within an execution space associated with the same, and/or any other information and/or applications configured to implement embodiments of the systems and methods disclosed herein.

One of ordinary skill in the art will appreciate that the systems and methods described herein can be practiced with computing devices similar or identical to that illustrated in FIG. 5, or with virtually any other suitable computing device, including computing devices that do not possess some of the components shown in FIG. 5 and/or computing devices that possess other components that are not shown. Thus it should be appreciated that FIG. 5 is provided for purposes of illustration and not limitation.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method performed by a system comprising a processor and a non-transitory computer-readable storage medium storing instructions that, when executed, cause the system to perform the method, the method comprising:
receiving a protected cryptographic client module and a wrapped cryptographic key;

executing the protected cryptographic client module within a sandboxed execution environment of the system;

importing the wrapped cryptographic key into the protected cryptographic client module within the sandboxed execution environment;

exposing an interface of the protected cryptographic client module, the interface providing a set of one or more defined functions, the set of one or more defined functions being based, at least in part, on the wrapped cryptographic key;

receiving, via the interface of the protected cryptographic client module from a first application executing outside the sandboxed execution environment, a request to perform at least one function of the set of one or more defined functions using the wrapped cryptographic key;

performing, by the protected cryptographic client module within the sandboxed execution environment, the at least one function using the wrapped cryptographic key; and sending, by the protected cryptographic client module, a result of the at least one function to the first application.

2. The method of claim 1, wherein the set of one or more defined functions are identified in information associated with the wrapped cryptographic key.

3. The method of claim 2, wherein the information associated with the wrapped cryptographic key comprises key metadata.

4. The method of claim 1, wherein the sandboxed execution environment is associated with a software application executing on the system.

5. The method of claim 4, wherein the software application comprises a browser application.

6. The method of claim 1, wherein the protected cryptographic client module comprises a script application.

7. The method of claim 1, wherein the wrapped cryptographic key comprises an encrypted cryptographic key.

8. The method of claim 7, wherein the protected cryptographic client module stores a protected private key.

9. The method of claim 8, wherein the encrypted cryptographic key is decryptable using the protected private key.

10. The method of claim 9, wherein the protected private key comprises a private key protected with white-box cryptography.

11. The method of claim 1, wherein the at least one function comprises a decryption operation.

12. The method of claim 1, wherein the at least one function comprises an encryption operation.

13. The method of claim 1, wherein the at least one function comprises a cryptographic signature operation.

14. The method of claim 1, wherein the at least one function comprises a cryptographic signature verification operation.

15. The method of claim 1, wherein the wrapped cryptographic key comprises a wrapped server key.

16. The method of claim 1, wherein the wrapped cryptographic key comprises a wrapped user key.

17. The method of claim 1, wherein the method further comprises performing, by the protected cryptographic client module, a code verification check operation to confirm that the protected cryptographic client module has not been modified.

18. The method of claim 1, wherein the method further comprises performing, by the protected cryptographic client module prior to importing the wrapped cryptographic key, an authorization check to determine that the wrapped cryptographic key is permitted to be imported into the protected cryptographic client module.

* * * * *